(12) United States Patent
Higashiura et al.

(10) Patent No.: US 7,469,263 B2
(45) Date of Patent: Dec. 23, 2008

(54) CONTENT MANAGEMENT SYSTEM FOR ARCHIVING DATA, MANAGING HISTORIES, VALIDITY OF CONTENT REGISTRATION CERTIFICATION WHEREIN THE MANAGEMENT DEVICE ENCRYPTS THE CONTENT IN RESPONSE TO A CONTENT STORAGE, ENCRYPTS THE ENCRYPTION KEY WITH THE MEDIA ID

(75) Inventors: Yasuyuki Higashiura, Inagi (JP); Takumi Kishino, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 222 days.

(21) Appl. No.: 10/603,816

(22) Filed: Jun. 26, 2003

(65) Prior Publication Data

US 2004/0010509 A1    Jan. 15, 2004

(30) Foreign Application Priority Data

Jul. 12, 2002    (JP)    ............................. 2002-204106

(51) Int. Cl.
*G06F 17/30*    (2006.01)
*G06F 7/00*    (2006.01)
*H04L 9/00*    (2006.01)
*H04L 9/32*    (2006.01)

(52) U.S. Cl. ............................ 707/204; 707/1; 707/10; 707/203; 380/281; 713/189

(58) Field of Classification Search ...................... 707/1, 707/203–204, 10; 380/239, 241, 281, 284, 380/44; 713/165–166, 171–176, 189, 193; 705/51
See application file for complete search history.

(56) References Cited

U.S. PATENT DOCUMENTS

| | | | | |
|---|---|---|---|---|
| 6,249,866 | B1 * | 6/2001 | Brundrett et al. | ............. 713/165 |
| 6,367,013 | B1 * | 4/2002 | Bisbee et al. | ............... 713/178 |
| 6,385,596 | B1 * | 5/2002 | Wiser et al. | .................... 705/51 |
| 6,606,707 | B1 | 8/2003 | Hirota et al. | |

(Continued)

FOREIGN PATENT DOCUMENTS

EP    0 989 443 A2    3/2000

(Continued)

OTHER PUBLICATIONS

Miller,E et al. "Storing security for distributed file systems", IEEE in conference on performance, computuing and communications, 2001, pp. 34-40.*

(Continued)

*Primary Examiner*—Srirama Channavajjala
(74) *Attorney, Agent, or Firm*—Staas & Halsey LLP (57) ABSTRACT

A content management system manages an original of electronic data content and is capable of handling increases in the volume of electronic data and maintains uniqueness of the original. Serial content management or processing history is managed by an original management device, and content data alone is archived on portable media with media IDs. Therefore, increases in the volume of electronic data can be easily handled, a history of updates to the original can be managed by the system, and uniqueness of the original can be confirmed by the media IDs because the medium-specific media IDs are treated as original data.

9 Claims, 8 Drawing Sheets

U.S. PATENT DOCUMENTS

| | | | |
|---|---|---|---|
| 7,233,948 B1* | 6/2007 | Shamoon et al. | 707/9 |
| 7,277,941 B2* | 10/2007 | Ignatius et al. | 709/225 |
| 2001/0009580 A1* | 7/2001 | Ikeda | 380/201 |
| 2001/0032088 A1 | 10/2001 | Utsumi et al. | |
| 2002/0002561 A1* | 1/2002 | Higashiura et al. | 707/204 |
| 2002/0049910 A1* | 4/2002 | Salomon et al. | 713/193 |
| 2002/0076050 A1* | 6/2002 | Chen et al. | 380/231 |
| 2002/0169973 A1* | 11/2002 | Kim et al. | 713/193 |

FOREIGN PATENT DOCUMENTS

| | | | |
|---|---|---|---|
| EP | 1018733 | * | 7/2000 |
| EP | 1313259 | * | 5/2003 |
| JP | 4-157585 | | 5/1992 |
| JP | 05-307500 | | 11/1993 |
| JP | 09-212406 | | 8/1997 |
| JP | 10-264655 | | 10/1998 |
| JP | 11-328033 | | 11/1999 |
| JP | 2000-99010 | | 4/2000 |
| JP | 2000-113586 | | 4/2000 |
| JP | 2000-358003 | | 12/2000 |
| JP | 2001-14441 | | 1/2001 |
| JP | 2001-78266 | | 3/2001 |
| JP | 2001-117820 | * | 4/2001 |
| JP | 2002-82821 | | 3/2002 |
| JP | 2002-24104 | | 1/2005 |
| WO | WO 00/21239 | * | 4/2000 |
| WO | WO 2004/046899 | * | 6/2004 |

OTHER PUBLICATIONS

*Reference AG (JP 2001-014441) corresponds to Reference AA (US 6,606,707).

* cited by examiner

| | REGISTER | UPDATE | REFER | READ |
|---|---|---|---|---|
| ORIGINAL (ON-LINE) | CAPABLE BY REGISTRATION CERTIFICATION | NEWLY REGISTRATION BY REGISTRATION CERTIFICATION | CAPABLE BY REGISTRATION CERTIFICATION | CAPABLE BY REGISTRATION CERTIFICATION |
| COPY OF ORIGINAL (AUTHORIZED COPY) | | | | CAPABLE BY KEY |

CONTENT MANAGEMENT SYSTEM FOR ARCHIVING DATA, MANAGING HISTORIES, VALIDITY OF CONTENT REGISTRATION CERTIFICATION WHEREIN THE MANAGEMENT DEVICE ENCRYPTS THE CONTENT IN RESPONSE TO A CONTENT STORAGE, ENCRYPTS THE ENCRYPTION KEY WITH THE MEDIA ID

BACKGROUND OF THE INVENTION

1. Field of the Invention

The present invention relates to a content management system for managing content as electronic data, and more particularly to a content management system for storing content in an exchangeable storage medium and managing the original content.

2. Description of the Related Art

Due to recent developments in information processing systems, documents, diagrams, and other such content stored on paper has begun to be stored as electronic data. Because such electronic data can be easily changed, the original must be managed as electronic data.

Electronic data must therefore be provided with the following original attributes to enable content management of electronic data: first, a function that makes it possible to detect that the original electronic data has not been altered; second, a function that prevents third parties from unauthorized viewing of the electronic data; third, a history management function for the actual steps involved in the handling of the original electronic data; fourth, a function that makes it possible to trace the contents of each version or any changes in the original; and fifth, a function for guaranteeing the uniqueness of the original.

According to such requirements, in order to prevent tampering, a file server stores an electronic data, has an authority to access the file server (passwords and the like), and logs the operating history. While this method can prevent the original from being altered, it is still difficult to manage revisions to the original or to guarantee uniqueness of the original. For example, when electronic data is copied, it is unclear which original the copied data corresponds to.

It has therefore been proposed that electronic data of each edition be saved on the hard disk or other such internal storage device of a file server, that the revision number history of each edition be saved, and that original attributes (which signify that the original has not been altered) of electronic data on a file server be guaranteed (for example, Japanese Patent Application Laid-open No. 2002-82821).

However, the above-mentioned proposal is concerned with saving electronic data in a storage device of a file server, so the electronic data must be saved on an external storage medium and is divided between the internal storage medium and external storage medium when the volume of the electronic data surpasses the capacity of the storage device, complicating the system for managing the original. A specific drawback is that existing expandability is insufficient to handle an increase in the volume of electronic data (original).

The original attributes of electronic data are difficult to manage when the electronic data is saved on an external storage medium. Specifically, saving electronic data on an external storage medium allows the original to be taken out because of the nature of the external storage medium, making it difficult to manage the original and to distribute reproductions of the original while protecting the original or the copyright.

SUMMARY OF THE INVENTION

Consequently, an object of the present invention is to provide a content management system capable of easily managing an original when the original is saved on an external storage medium in response to an increase in the volume of electronic data in the original.

Another object of the present invention is to provide a content management system capable of saving data managed as an original on an external storage medium when the original is saved on an external storage medium in response to an increase in the volume of electronic data in the original.

A further object of the present invention is to provide a content management system for unifying management of each version of an original when the original is saved on an external storage medium in response to an increase in the volume of electronic data in the original.

In order to achieve these objects, the content management system of the present invention comprises a management device for managing the content processing history and a portable medium for saving the content, that is removed and attached to the management device and has a media ID. And the management device, on a request from an external device, registers and revises the content on the portable medium and manages processing history and the media ID for the content.

In the present invention, serial management or processing history of content is stored in the management device and data is managed solely by the portable medium, making it easier to respond to an increase in the volume of electronic data. The history of updates to the original can be managed by the system, and because a medium having a medium-specific media ID is treated as original data, the uniqueness of the original can be established by the media ID.

Another preferred feature of the present invention is that the management device creates a registration certificate in response to registration and revision of the content, stores the result together with the content on the portable medium, determines the validity of the registration certificate from the external device, and allows access to the content of the portable medium. This allows the stored content to be accessed only by users notified of the registration certificate, and prevents unauthorized access.

Yet another preferred feature of the present invention is that the management device creates a registration certificate in response to registration and revision of the content, stores the result as content management information, determines the validity of the registration certificate from the external device, and allows the content processing history to be read. This allows the content history to be accessed only by those notified of the registration certificate, and prevents unauthorized access.

Still another preferred feature of the present invention is that the management device encrypts the content with an encryption key produced by random numbers in response to the content storage, encrypts the encryption key with the media ID, and stores the encrypted content and encrypted encryption key on the portable medium of the media ID. This can prevent unauthorized reading and maintain the uniqueness of the original even if the portable medium is taken out.

Another feature of the present invention is that the management device creates and stores serial content managing information in response to registration and revision of the content. The relationship between the initial version and revised versions of the original is thus specified.

Furthermore, the present invention should preferably comprise a copying medium for storing the encrypted content on the portable medium and distribute the encryption key and the copying medium to users of the copying medium. This allows only authorized distributors to use copies of registered content and ensures copyright protection.

An additional preferred feature of the present invention is that the management device and the external device are networked. This allows content to be easily registered and updated the portable media in the management device.

DESCRIPTION OF THE PREFERRED EMBODIMENTS

The embodiments of the present invention are described hereinbelow as a content management system, content management routine, and other embodiments, but the present invention is not limited to the following embodiments.

[Content Management System]

Figure 1:
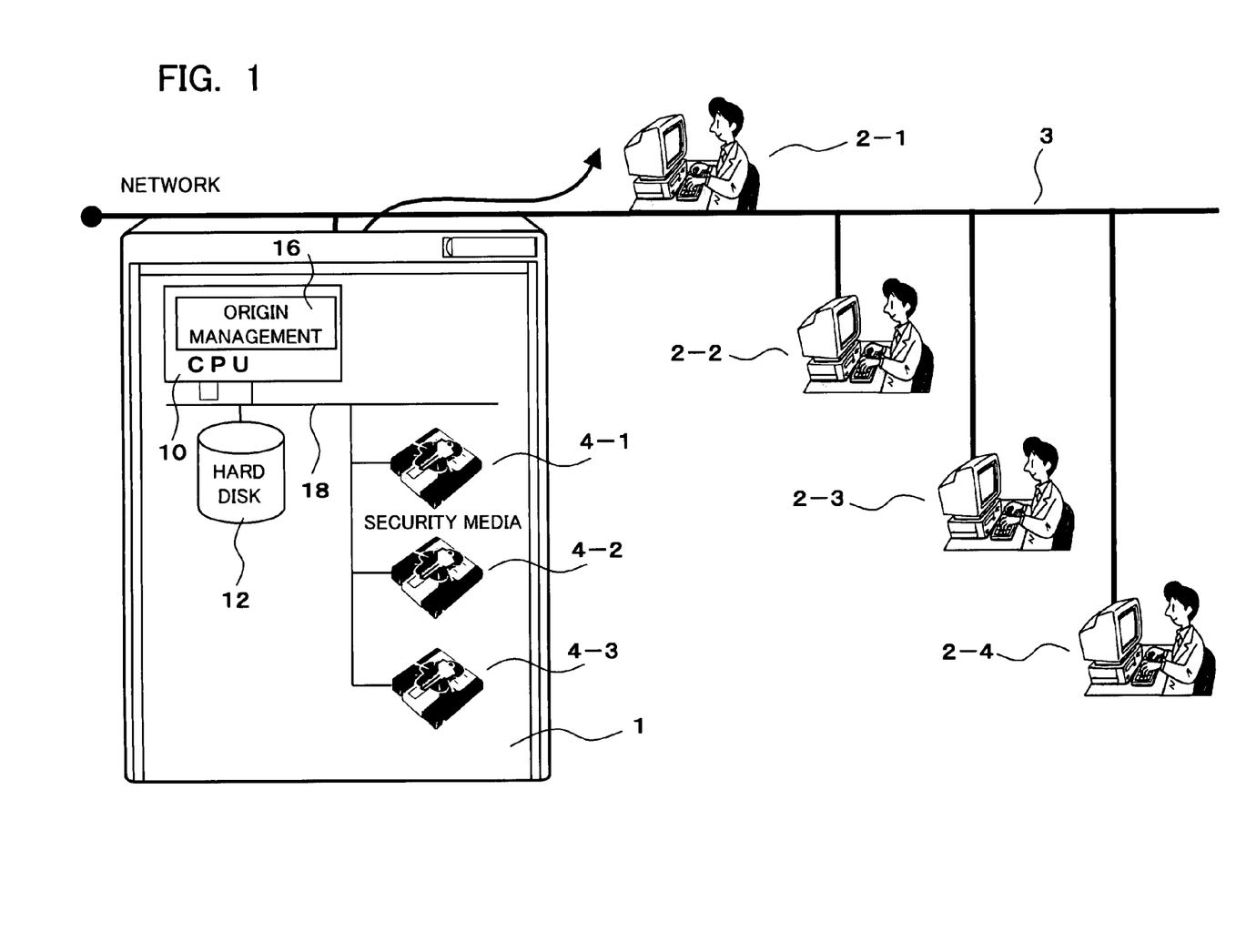
FIG. 1 is a structural diagram of a content management system of the first embodiment of the present invention.
Figure 2:
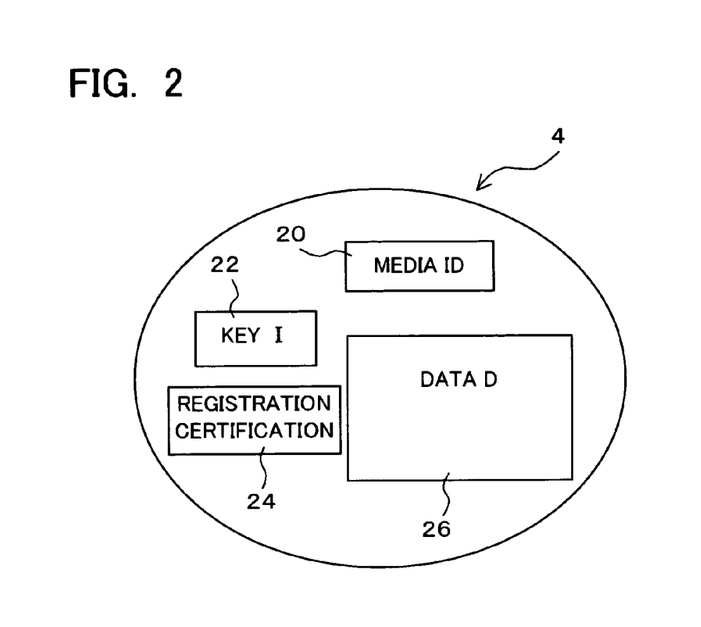
FIG. 2 is an explanatory diagram of the storage medium with a media ID in FIG. 1.
Figure 3:
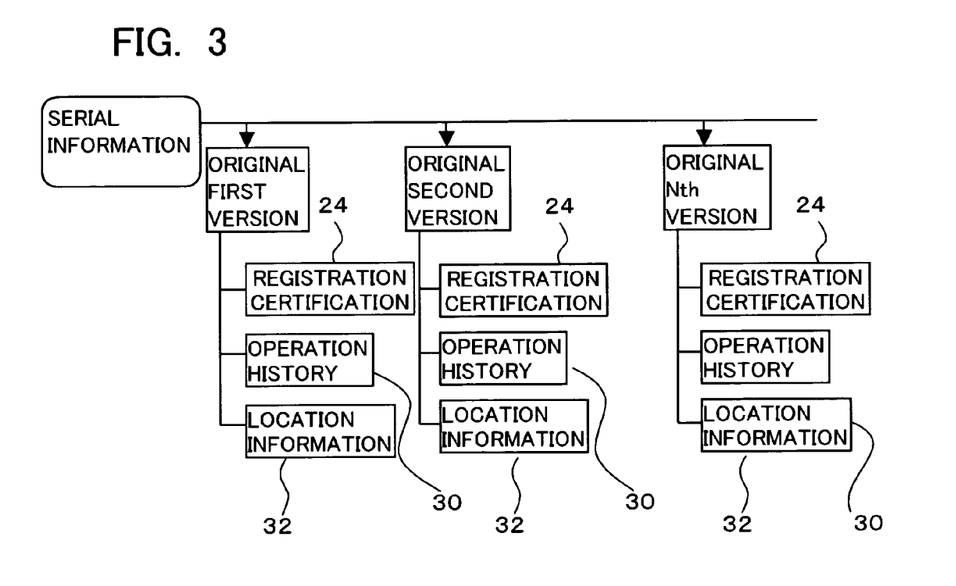
FIG. 3 is an explanatory diagram of original management in the management device in FIG. 1.

FIG. 1 is a structural diagram of a content management system of the first embodiment of the present invention, FIG. 2 is an explanatory diagram of data stored on a secure medium in FIG. 1, and FIG. 3 is an explanatory diagram of the original management routine in FIG. 1.

As shown in FIG. 1, clients (terminals) 2-1, 2-2, 2-3, and 2-4, who are registering data, are connected by a network 3 to a management device 1 for managing the original. The management device 1 is composed, for example, of a file server. The clients 2-1 through 2-4 are composed of personal computers comprising, for example, a display, a keyboard, and a processing unit. The network 3 is composed, for example, of a LAN (Local Area Network).

The management device 1 has a processor (CPU) 10 for performing an original management routine 16, a hard disk device (HDD) 12 for storing original management information and serial information for original management, a drive for external storage media 4-1, 4-2, and 4-3 that store the original, and a bus 18 for connecting these components.

The external storage media 4-1, 4-2, and 4-3 are composed of magneto-optical disks (MO) or other such security storage media. A security medium is a storage medium provided in advance with a media ID (identifier) that is characteristic of the storage medium, and is a medium that has increased security. In this example, the security media 4-1, 4-2, and 4-3 are composed of portable MO's, and a single MO drive or a plurality of drives are connected by the bus 18.

As shown in FIG. 2, the data composition of the security media 4 comprises a medium-specific media ID 20, data 26 encrypted using a random number as the data encryption key, and a key 22 in which the data encryption key composed of the random number is encrypted by the media ID. A registration certificate 24 for original management to be later described is also stored.

Such security media are identified by media IDs. In the present invention, these security media are used to save the original.

Next, the original is managed by the management device 1. FIG. 3 is an explanatory diagram describing the original management routine 16 in FIG. 1. The relationship between the different versions of the original is defined by serial information, and management information 24, 30, and 32 are defined for the original of each version.

Operating history information 30 manages, according to history, who performed what routine at what time on the original of each version; for example, the registrant, the date of registration, the reader, the date of reading, the reviser, the date of revision, and the like. The original of each version (initial version, second version, Nth version) is saved as is so that persons wishing to verify former editions can return to the state existing at that time. The original of each version is saved as such on the above-mentioned security medium.

The registration certificate information 24 is issued at the time the original is registered and may, for example, consist of a document management number or the like. Location information 32 indicates the media ID of the media 4-1, 4-2, and 4-3 on which data is archived.

Basic functions of the original management routine 16 will be described. When the clients 2-1 through 2-4 register-data, this data is transmitted upon request to the management device 1. Upon registry, the management device 1 creates and manages serial management information, operating history, and other types of original management information. Data to be request registration is encrypted as previously described in the portable media (security media) 4-1 through 4-3 provided with media IDs, and is stored as an original.

Upon registering a document (data), the management device 1 returns a registration certificate having registered positional information (document management number) to the client. It is then possible to designate a registration certificate and to read original management information such as the revision history, the date of revision, and the reviser.

When registration data is then updated, the client 2-1 through 2-4 transmit updated data and a registration certificate of the registration data to be updated to the management device 1. The management device 1 manages the result as serial data similar to the target original. As with registration, this updated data is written into the portable media 4-1 through 4-3 provided with media IDs. Specifically, the question of who performed what routine at what time is managed by the operating history 30, and each version number is saved, because persons wishing to verify former editions can return to the state existing at that time.

Specifically, the serial management information is. management information for displaying a series consisting of the initial version, second version, and Nth version of the original, and this information is created by registering and updating the original. The original management information has, for each original, a registration certificate 24, an operating history 30 as a history of who conducted the registration/ update at what time, and location information 32 for displaying the media IDs of media with archived data.

The original management routine 16 of the CPU 10 conducts a management routine (serialized routine) of registration/updates as previously described. The original itself is stored in the portable media 4-1 through 4-3, and can be read by the clients 2-1 through 2-4. If necessary, the portable media can be used to send a transmission to a device environment devoid of the original management routine 16.

The original is commonly copied by a procedure in which data is read by the clients 2-1 through 2-4 from the portable media 4-1 through 4-3, and distribution media can be created by copying according to the same logic.

[Content Management Routine]

Next, the original management routine for the CPU 10 in FIG. 1 will be described with reference to FIGS. 4 through 11.

Figure 4:
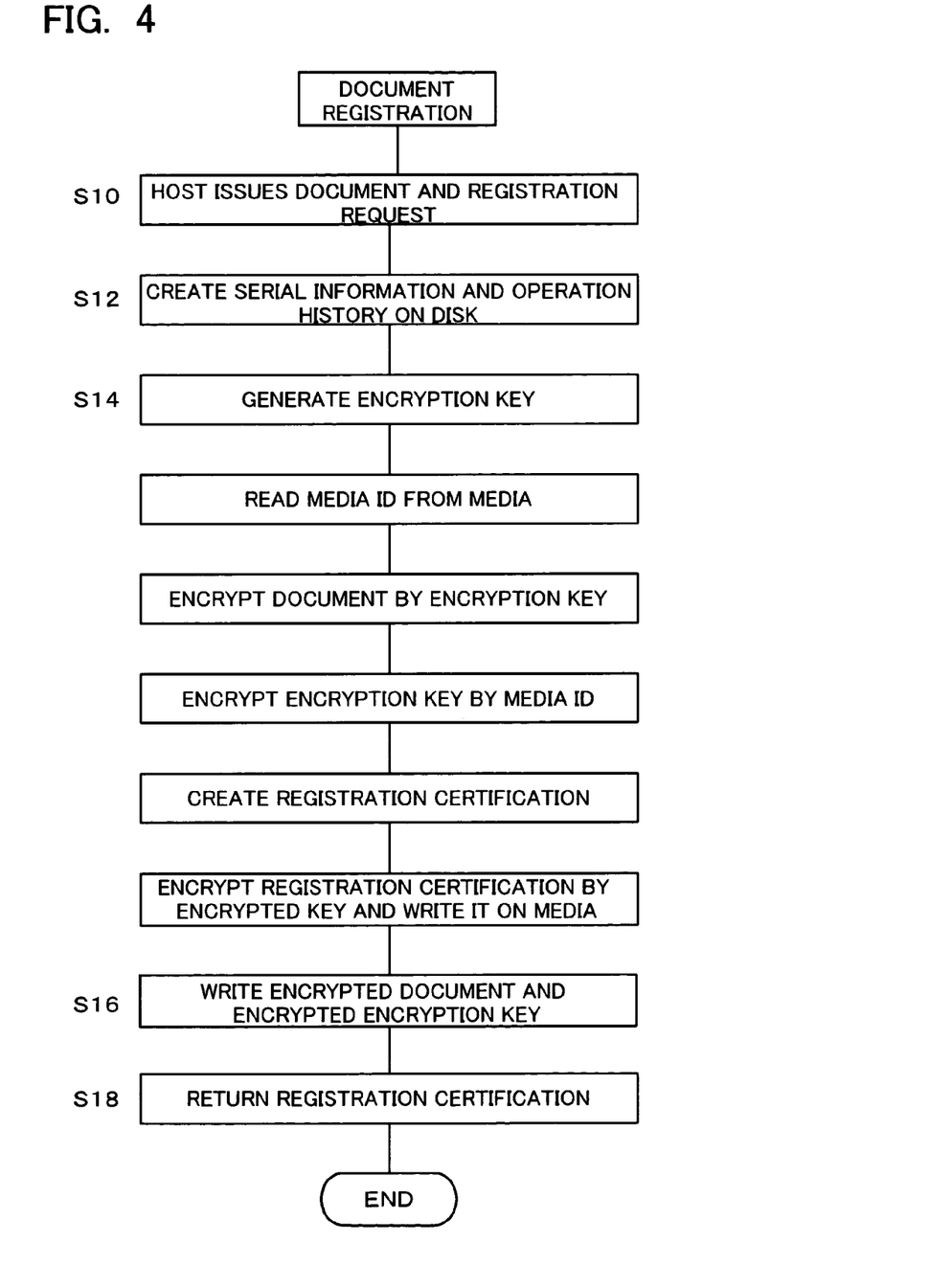
FIG. 4 is a flowchart of the document registration routine in the structure in FIG. 1.
Figure 5:
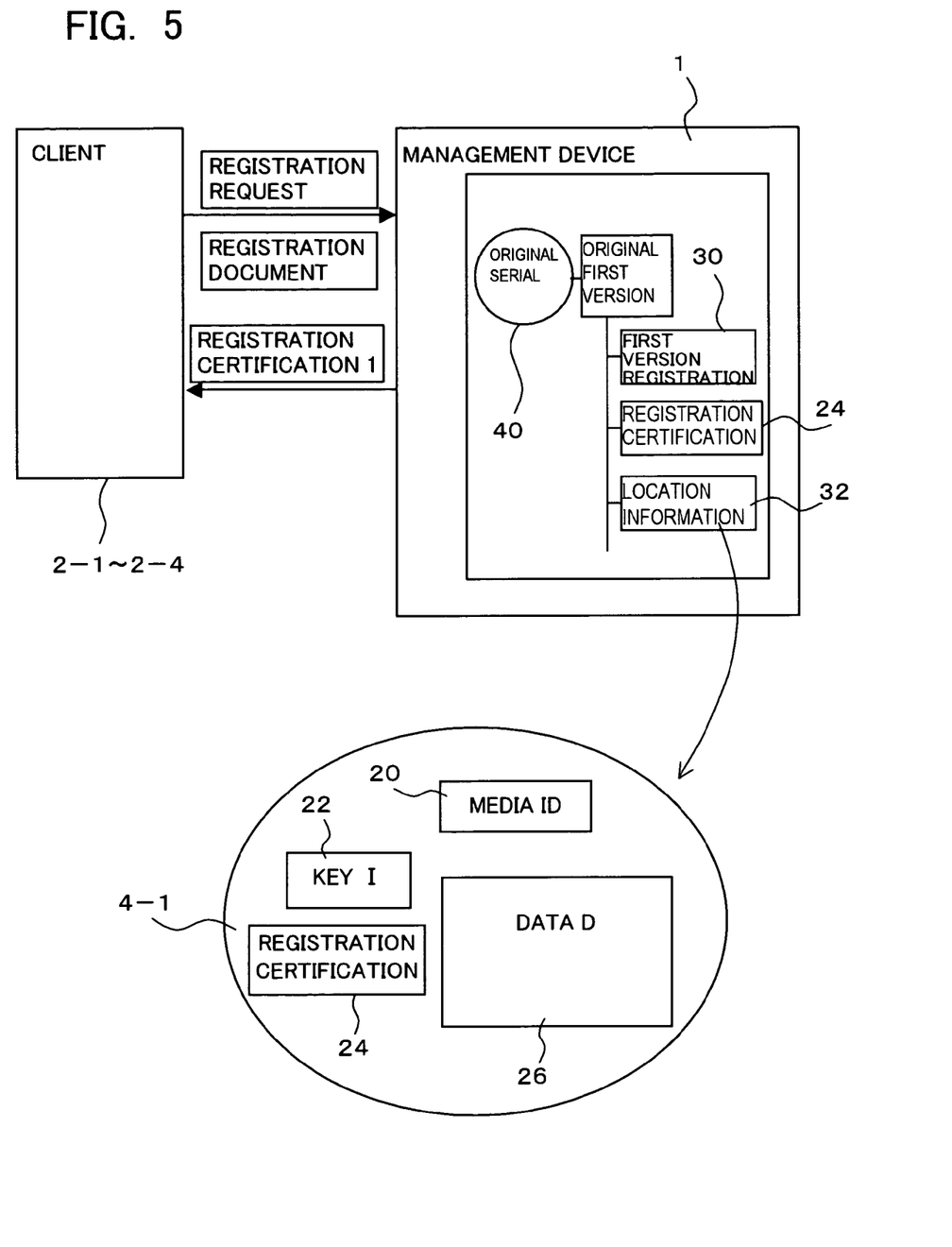
FIG. 5 is an explanatory diagram of the document registration processing flow in FIG. 4.

FIG. 4 is a flowchart of a document registration routine (initial version registration routine), and FIG. 5 is an explanatory diagram of the operation thereof. The document registration routine is described according to FIG. 4 with reference to FIG. 5.

(S10) The host devices (clients) 2-1 through 2-4 issues registration document data and a registration request to the management device 1.

(S12) Upon receiving the registration request, the management device 1 creates serial management 40 and processing history 24, 30, and 32 in an internal disk device 12. Specifically, the initial version of the original is registered as serial management information 40, and the initial version registration information (registrant, date of registration, etc.) is registered in the operating history 30.

(S14) Next, an encryption key is produced by random numbers, and the document data and registration certificate are encrypted. Next, the media ID is read from the portable write medium 4-1, and the encryption key is encrypted using the media ID as the key.

(S16) The CPU 10 writes the encrypted document.26, the registration certificate 24, and the encrypted encryption key 22 to the portable medium 4-1. The registration certificate 24 and location information (media ID) 20 are registered on the disk device 12 as original management information.

(S18) The management device 1 notifies the registration certificate to the client 2-1 who has requested a registration.

Thus, only the original portion is written to the portable media 4-1 through 4-3, and the original management information is archived and managed by the management device 1. Therefore, the original can be managed in a consolidated manner by the management device even when stored on expandable portable media.

Since data is encrypted and stored in the portable media 4-1 through 4-3 by a method in which random numbers created by the management device 1 are used as an encryption key, read limitations are imposed and unauthorized reading can be prevented. Since the media IDs of the portable media 4-1 through 4-3 are encrypted by random numbers as a common key (key with encrypted data) and written in, it is all the more difficult to decipher each data encryption key, and unauthorized reading can be prevented when the original is stored in the portable media.

Figure 6:
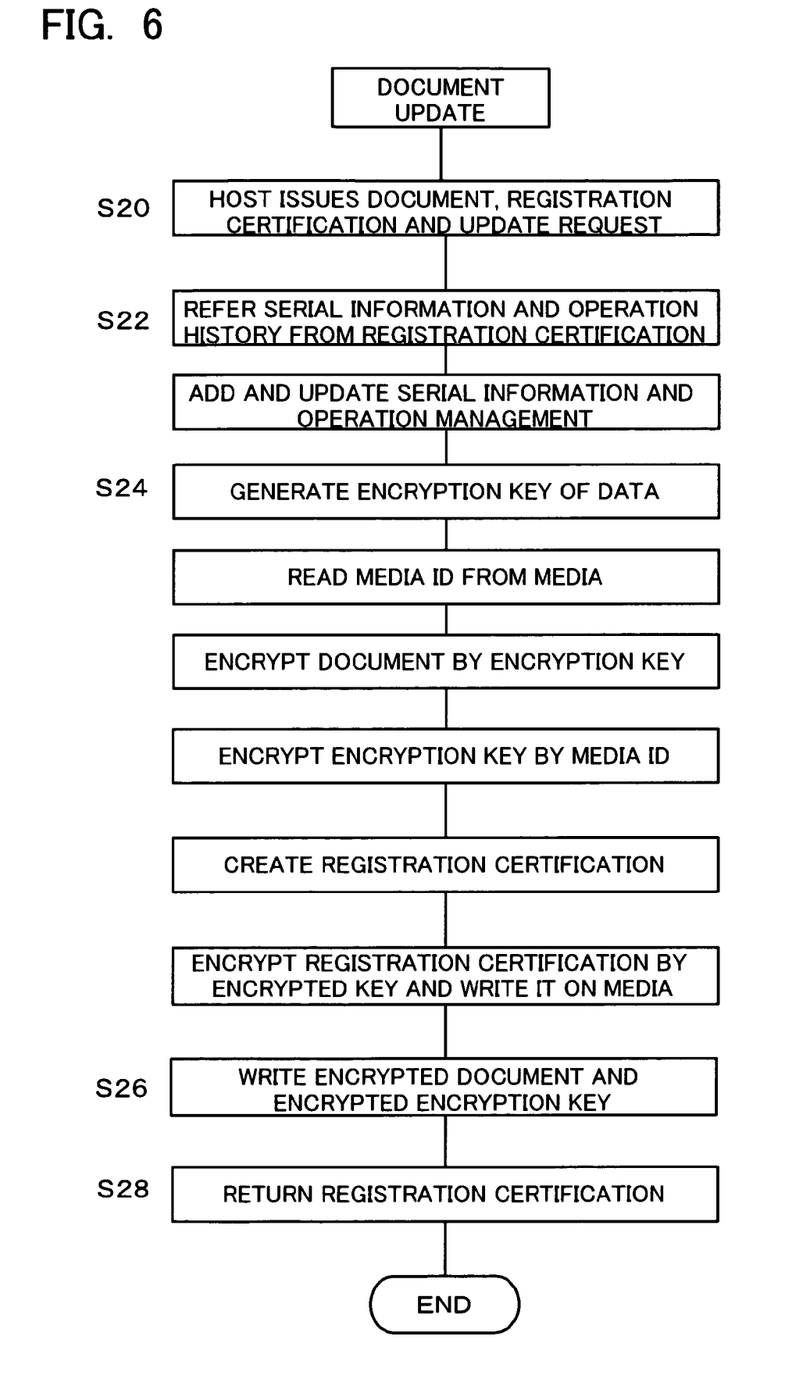
FIG. 6 is a flowchart of the document updating routine in the structure in FIG. 1.
Figure 7:
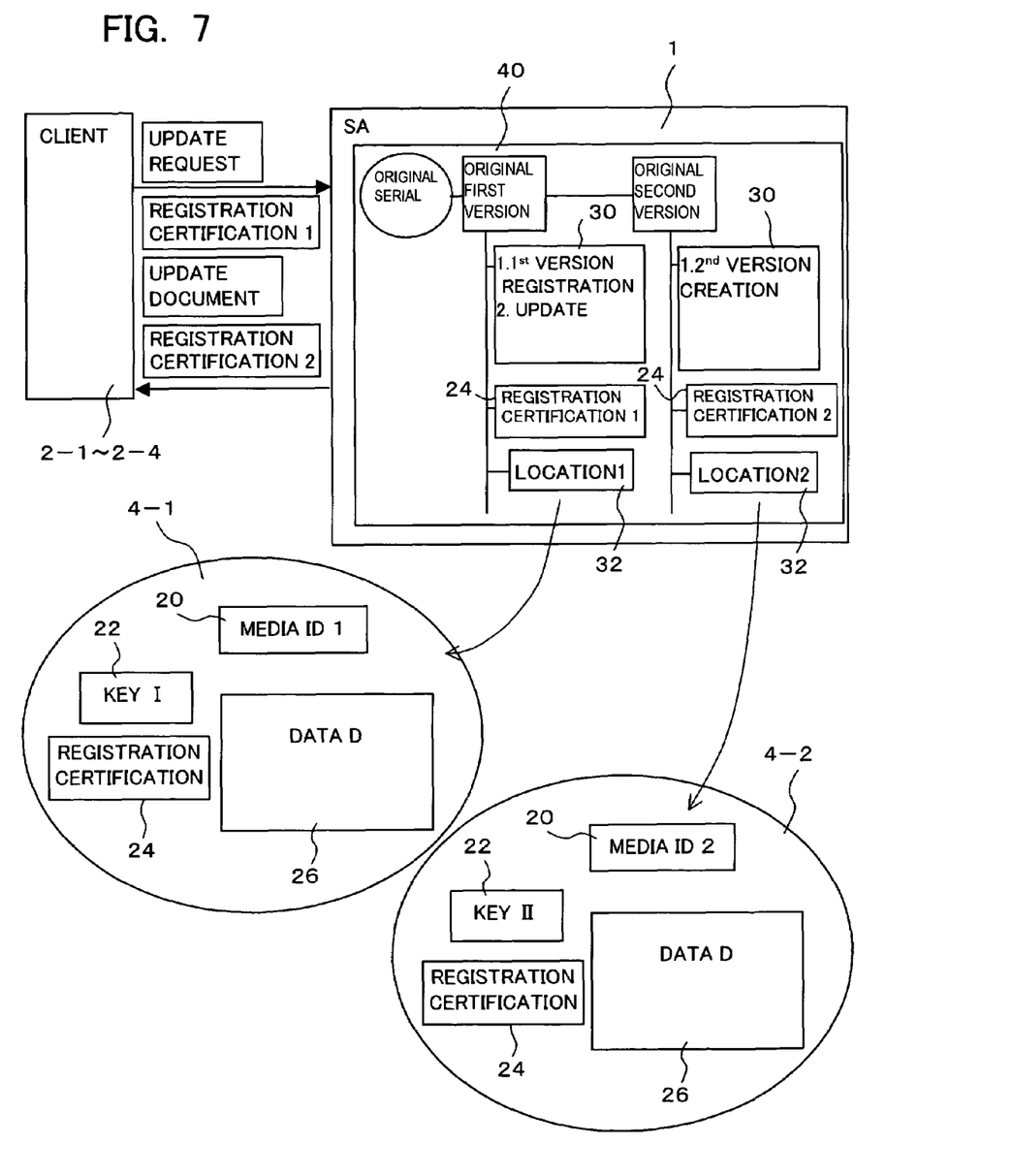
FIG. 7 is an explanatory diagram of the document updating routine in FIG. 6.

FIG. 6 is a flowchart of a document updating routine (revision registration routine), and FIG. 7 is an explanatory diagram of the operation thereof. The document updating routine is described according to FIG. 6 with reference to FIG. 7.

(S20) The host devices (clients) 2-1 through 2-4 issues a registration certificate, updated document data, and an updating request for the initial version to the management device 1.

(S22) Upon receiving an updating request, the management device 1 refers to the serial management 40 and processing history 24, 30, and 32 on the internal disk device 12 on the basis of the received registration certificate, and determines the original series. Next, the second version of the original corresponding to the initial version of the original is registered as serial management information 40, and updating registration information (updater, date of updating, and the like related to the initial version of the original; and second version preparer, date of preparation, and the like related to the second version of the original) is registered in the operating history 30.

(S24) Next, an encryption key is produced by random numbers, and the updated document data and registration certificate are encrypted. Next, media ID 2 is read from the portable write medium 4-2, and the encryption key is encrypted using the media ID 2 as the key.

(S26) The CPU 10 writes the encrypted document 26, the registration certificate 24, and the encrypted encryption key 22 to the portable medium 4-2. The registration certificate 24 and location information (media ID) 20 are registered on the disk device 12 as original management information for the second version of the original.

(S28) The management device 1 notifies the registration certificate for the second version to the client 2-1 who has requested an update.

Thus, only the original portion is written to the portable media 4-1 through 4-3, and the original management information is archived and managed by the mainframe device 1. Therefore, the original series can be managed in a consolidated manner by the management device even when the original is stored on expandable portable media.

Figure 8:
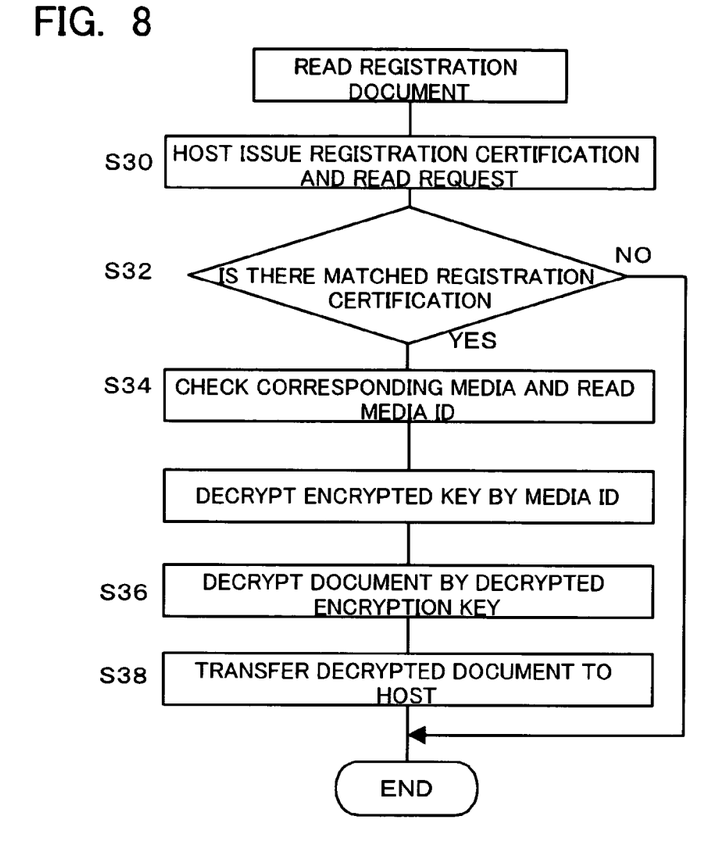
FIG. 8 is a flowchart of the registered document reading routine in the structure in FIG. 1.

Next, the routine for reading the original data stored in the portable media will be described with reference to the flowchart of the registered document reading routine in FIG. 8.

(S30) The host devices (clients) 2-1 through 2-4 directs a request for reading the data to the management device 1 together with the registration certificate of the document to be read.

(S32) The management device 1 compares the registration certificate of the original management information 32 on the disk device 12 with the requested registration certificate, and it is determined whether the two correspond. If they do not correspond, the routine is terminated.

(S34) If the registration certificates are confirmed to be identical, the management device 1 checks the portable medium 4-1 inserted into the drive and reads the media ID 20. The encrypted encryption key 22 stored in the portable medium 4-1 is decrypted by the media ID 20.

(S36) The encrypted document 26 stored in the portable medium 4-1 is decrypted by the decrypted encryption key.

(S38) The decrypted data is delivered to the clients 2-1 through 2-4.

Figure 9:
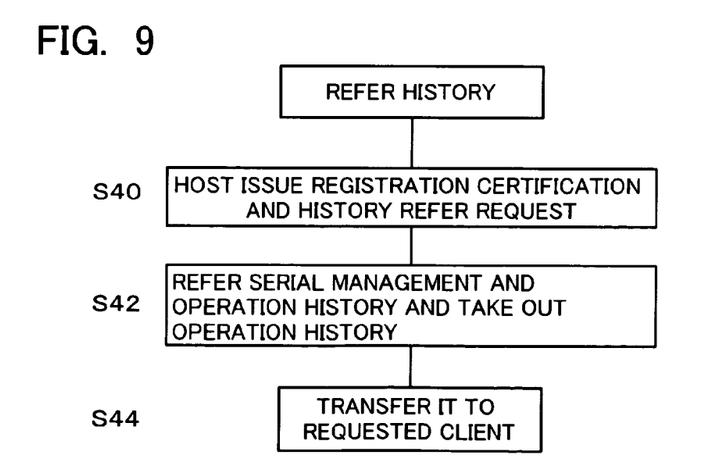
FIG. 9 is a flowchart of the history reference routine in the structure in FIG. 1.

Next, the history reference routine for the original data will be described with reference to the flowchart of the history reference routine in FIG. 9.

(S40) The host devices (clients) 2-1 through 2-4 directs the request for history reference to the management device 1 together with the registration certificate of the document to be read.

(S42) The management device 1 compares the registration certificate of the original management information 32 on the disk device 12 with the requested registration certificate, and it is determined whether the two correspond. If they do not correspond, the routine is terminated. If the registration certificates are confirmed to be identical, the operating history 30 is retrieved.

(S44) The retrieved operating history is delivered to the clients 2-1 through 2-4.

Thus, serial management or processing history is stored in the original management device 1 and can be managed solely as data by the portable media. Therefore, the history of updates to the original can be managed by the system. It is possible to retrieve and archive a single medium in a safe location (a vault or the like) in order to store data in a medium having a media ID. It is possible to establish the uniqueness of the original by a medium-specific media ID because a medium having this media ID is treated as original data.

Figure 10:
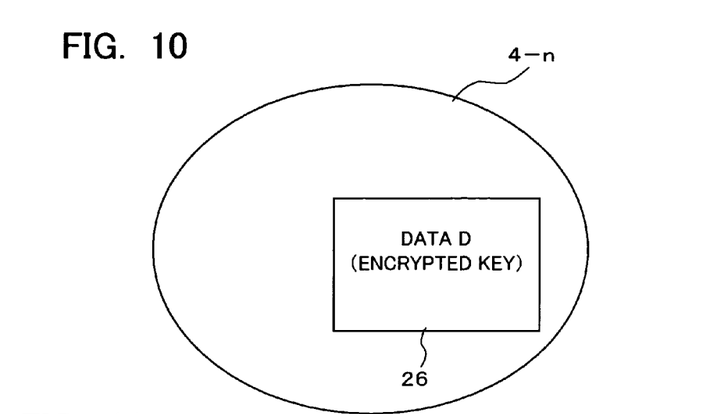
FIG. 10 is an explanatory diagram of the content copying medium in FIG. 2.

Furthermore, when copies of the medium are distributed, only data 26 encrypted by an encryption key is stored in a distribution medium 4-n, whereas the encryption key and registration certificate are not stored, as shown in FIG. 10. Data encrypted by media IDs for which an encryption key is provided is distributed to a distributor as a license. Therefore, only a user with distributed media and a license can decrypt the data, so only a licensed user who possesses an authentic distribution medium can use the stored data.

Figure 11:
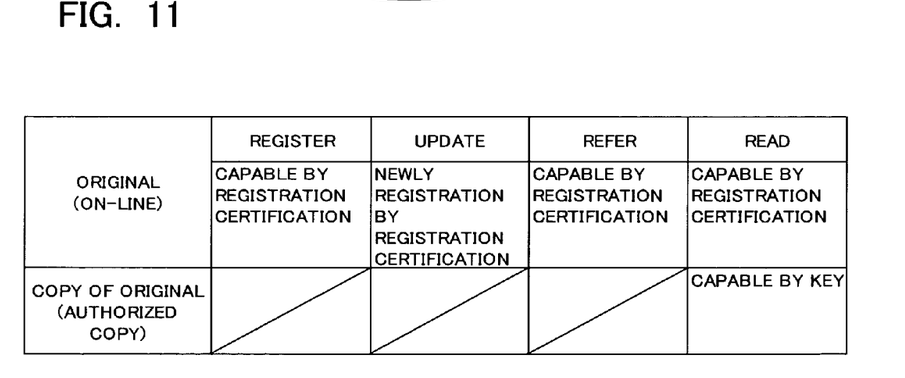
FIG. 11 is an explanatory diagram of the operation for accessing the original according to the first embodiment of the present invention.

FIG. 11 is an explanatory diagram of the aspects of licensing the original and reproduction according to the present invention. When the original is used within the management device (online), the original can be registered, updated, referenced, and read according to the registration certificate, as shown in FIG. 11.

When making authorized reproductions of the original, only a licensed user in possession of an authorized distribution medium can read the stored data because this user has the permission to use the encryption key, as shown in FIG. 10.

Thus, serial management or processing history is stored in the original management 1 and can be managed solely as data by the portable media. Therefore, increases in the volume of electronic data can be easily handled, the history of updates to the original can be managed by the system, and the uniqueness of the original can be established by a medium-specific media ID because a medium having this media ID is treated as original data.

Furthermore, when copies of the medium are distributed, only a licensed user with an authorized distribution medium can use the stored data. Therefore, reproductions can be used while only data in which the original attributes are protected in portable media is managed using portable media.

Other Embodiments

In the above-mentioned embodiments, secure media was described with reference to MO (magnetooptic disk), but CD-Rs, DVDs and other such optical disks, portable magnetic disks, semiconductor memory, and the like can also be used. Documents, diagrams, and the like can be used as electronic data in the form of an original.

The present invention was described above by way of embodiments, but various modifications can also be made within the scope of the essence of the present invention, and these need not be excluded from the scope of the present invention.

Serial content management or processing history is stored in an original management device, and data alone is managed by a portable medium, making it possible to respond easily to an increase in the volume of electronic data. The history of updates to the original can be managed by the system. The uniqueness of the original can be established by a medium-specific media ID because a medium having this media ID is treated as original data.

What is claimed is:

1. A content management system for archiving content as electronic data and managing an original, comprising:
    a management device for managing histories of a content registration processing and a content revision processing; and
    a storage unit provided in said management device; and
    a portable medium for containing the content, that is removably attached to the management device and has a media ID,
    wherein the management device, on register request from an external device, registers the content on the portable medium and stores a processing history of said registration processing and the media ID for the content in relation to each other into said storage unit; and on update request from said external device, stores revised content from said external device on the portable medium and stores a processing history of said revision processing and the media ID for the content in relation to each other into said storage unit,
    wherein the portable medium containing the content is removed from the management device while the processing history and the media ID remain in the management device;
    wherein the management device creates a registration certificate in response to the registration and revision of the content, stores a result together with the content on the portable medium, issues said registration certification to said external device, determines a validity of the registration certificate from the external device, and allows access to the content of the portable medium;
    wherein the management device stores the result as content management information, and allows the content processing history to be read; and
    wherein the management device encrypts the content in response to a content storage, encrypts the encryption key with the media ID, and stores the encrypted content and encrypted encryption key on the portable medium of the media ID.

2. The content management system according to claim 1, wherein the management device encrypts the content with an encryption key produced by random numbers in response to a content storage.

3. The content management system according to claim 1, wherein the management device creates and archives serial content managing information in response to registration and revision of the content.

4. The content management system according to claim 1, further comprising a copying medium for storing encrypted content on the portable medium,
    and wherein user is distributed an encryption key and copying medium.

5. The content management system according to claim 1, wherein the management device and an external device are connected via a network.

6. A content management system for archiving content as electronic data and managing an original, comprising:
    a management device for managing histories of a content registration processing and a content revision processing;
    a first storage unit provided in said management device; and
    a second storage unit for saving, the content, that has a media ID,
    wherein the management device, on a request input of a registration on the content, registers the content on the second storage unit and stores a processing history of said registration processing or a revision processing and the media ID for the content in relation to each other into said first storage unit;

and on a request input of a revision on the content, stores revised content on the second storage unit and stores a processing history of said revision processing and the media ID for the content in relation to each other into said first storage unit;

wherein the second storage unit containing the content is removed from the management device while the processing history and the media ID remain in the management device;

wherein the management device creates a registration certificate in response to the registration and revision of the content, stores a result together with the content on the portable medium, issues said registration certificate to said external device, determines a validity of the registration certificate from the external device, and allows access to the content of the portable medium;

wherein the management device determines a validity of the registration certification received from the external device, and allows that the external device reads the processing history of the content; and wherein the management device encrypts the content in response to a content storage, encrypts an encryption key that encrypts the content with the media ID, and stores the encrypted content and encrypted encryption key on the second storage unit of the media ID.

7. The content management system according to claim 6, wherein the management device creates and archives serial content managing information in response to registration and revision of the content.

8. A content management apparatus for managing contents, comprising:

a management device for managing histories of a content registration processing and a content revision processing; and a storage unit provided in said management device; and a portable medium for containing the content, that is removably attached to the management device and has a media ID, wherein the management device, on register request from an external device, registers the content on the portable medium and stores a processing history of said registration processing and the media ID for the content in relation to each other into said storage unit;

and on update request from said external device, stores revised content from said external device on the portable medium and stores a processing history of said revision processing and the media ID for the content in relation to each other into said storage unit, wherein the portable medium containing the content is removed from the management device while the processing history and the media ID remain in the management device; and wherein the management device creates a registration certificate in response to the registration and revision of the content, stores a result together with the content on the portable medium, issues said registration certification to said external device, determines a validity of the registration certificate from the external device, and allows access to the content of the portable medium;

wherein the management device stores the result as content management information, and allows the content processing history to be read; and wherein the management device encrypts the content with an encryption key in response to a content storage, encrypts the encryption key with the media ID, and stores the encrypted content and encrypted encryption key on the portable medium of the media ID.

9. A content management method for managing contents, comprising the steps of:

managing histories of a content registration processing and a content revision processing in a management device; and providing a storage unit in said management device; and providing a portable medium for containing the content, that is removably attached to the management device and has a media ID, wherein the management device, on register request from an external device, registers the content on the portable medium and stores a processing history of said registration processing and the media ID for the content in relation to each other into said storage unit; and on update request from said external device, stores revised content from said external device on the portable medium and stores a processing history of said revision processing and the media ID for the content in relation to each other into said storage unit, wherein the portable medium containing the content is removed from the management device while the processing history and the media ID remain in the management device;

wherein the management device creates a registration certificate in response to the registration and revision of the content, stores a result together with the content on the portable medium, issues said registration certification to said external device, determines a validity of the registration certificate from the external device, and allows access to the content of the portable medium;

wherein the management device stores the result as content management information, and allows the content processing history to be read; and wherein the management device encrypts the content with an encryption key in response to a content storage, encrypts the encryption key with the media ID, and stores the encrypted content and encrypted encryption key on the portable medium of the media ID.

* * * * *

UNITED STATES PATENT AND TRADEMARK OFFICE
CERTIFICATE OF CORRECTION

| | | |
|---|---|---|
| PATENT NO. | : 7,469,263 B2 | Page 1 of 1 |
| APPLICATION NO. | : 10/603816 | |
| DATED | : December 23, 2008 | |
| INVENTOR(S) | : Yasuyuki Higashiura et al. | |

It is certified that error appears in the above-identified patent and that said Letters Patent is hereby corrected as shown below:

First Page, Column 2 (Other Publications), Line 2, change "computuing" to --computing--.

Signed and Sealed this

Seventeenth Day of March, 2009

JOHN DOLL
*Acting Director of the United States Patent and Trademark Office*